(12) United States Patent
Zhu et al.

(10) Patent No.: US 7,012,822 B2
(45) Date of Patent: Mar. 14, 2006

(54) INTEGRATED TRACTION INVERTER MODULE AND DC/DC CONVERTER

(75) Inventors: Lizhi Zhu, Canton, MI (US); Xingyi Xu, Shanghai (CN)

(73) Assignee: Ballard Power Systems Corporation, Dearborn, MI (US)

(*) Notice: Subject to any disclaimer, the term of this patent is extended or adjusted under 35 U.S.C. 154(b) by 41 days.

(21) Appl. No.: 10/360,832

(22) Filed: Feb. 7, 2003

(65) Prior Publication Data

US 2003/0214826 A1  Nov. 20, 2003

Related U.S. Application Data

(60) Provisional application No. 60/319,116, filed on Feb. 20, 2002.

(51) Int. Cl.
*H02M 7/00* (2006.01)
(52) U.S. Cl. .................... 363/70; 363/132; 363/137
(58) Field of Classification Search .................. 363/70, 363/132, 137, 133, 134, 136
See application file for complete search history.

(56) References Cited

U.S. PATENT DOCUMENTS

| | | | |
|---|---|---|---|
| 4,920,475 A | 4/1990 | Rippel | 363/132 |
| 5,214,358 A * | 5/1993 | Marshall | 318/139 |
| 5,291,388 A | 3/1994 | Heinrich | 363/98 |
| 5,341,075 A | 8/1994 | Cocconi | 318/139 |
| 5,513,719 A * | 5/1996 | Moroto et al. | 180/65.4 |
| 5,589,743 A | 12/1996 | King | 318/139 |
| 5,642,270 A * | 6/1997 | Green et al. | 363/17 |
| 5,717,303 A | 2/1998 | Engel | 318/376 |
| 5,734,237 A | 3/1998 | Engel | 318/139 |
| 5,875,106 A | 2/1999 | Tenconi et al. | 363/98 |
| 6,124,644 A * | 9/2000 | Olson et al. | 290/1 B |
| 6,452,815 B1 * | 9/2002 | Zhu et al. | 363/17 |
| 6,484,830 B1 * | 11/2002 | Gruenwald et al. | 180/65.2 |
| 6,486,568 B1 * | 11/2002 | King et al. | 307/66 |
| 6,496,393 B1 * | 12/2002 | Patwardhan | 363/70 |

* cited by examiner

*Primary Examiner*—Bao Q. Vu
(74) *Attorney, Agent, or Firm*—Seed IP Law Group PLLC

(57) ABSTRACT

Integrated power conversion systems and methods for use in an electric vehicle having an electric motor, a primary high-voltage energy source, and an auxiliary energy source including a traction inverter module operable for converting a DC current generated by the high-voltage energy source into an AC current capable of powering the electric motor, and a DC/DC converter operable to step-down a voltage of the high-voltage energy source or step-up a voltage of the auxiliary energy source, wherein the traction inverter module and the DC/DC converter may share one or more common components, such as a common high-voltage DC bus capacitor, a common DC bus bar, and/or a common high-voltage transistor.

26 Claims, 4 Drawing Sheets

INTEGRATED TRACTION INVERTER MODULE AND DC/DC CONVERTER

BACKGROUND OF INVENTION

1. Field of the Invention

The present invention relates generally to integrated power conversion systems and methods for use in a variety of applications, such as battery-powered (electric) vehicle applications, fuel cell vehicle applications, and hybrid electric vehicle applications.

2. Description of the Related Art

Traditionally, the power conversion system of a battery-powered electric vehicle (EV), a fuel cell vehicle, and a hybrid electric vehicle (HEV) has included a plurality of separate, discrete components and assemblies. Among these components and assemblies are a traction inverter module (TIM) and a DC/DC converter.

The TIM, also called the electric power inverter, is operable for converting the raw DC current generated by a high-voltage fuel cell or high-voltage storage device (e.g., battery, flywheel, or ultracapacitor) into an AC current capable of powering an electric motor, such as a traction motor or a field-oriented induction motor. This power is converted for driving and controlling the motor, i.e., for generating torque. The motor, in combination with a transaxle, converts the electrical energy into mechanical energy which turns the wheels of the vehicle.

The DC/DC converter utilizes pulse-width modulation (PWM) to step the voltage associated with the vehicle's high-voltage battery or fuel cell down to that which the alternator of an internal combustion engine (ICE)-powered vehicle would typically generate (13.5–14V). The DC/DC converter, which may be unidirectional or bi-directional, may be used, for example, to charge a 12V auxiliary battery, which is typically separated from the high-voltage battery or fuel cell.

The DC/DC converter may also be used to transfer power from the auxiliary battery to the high-voltage battery or fuel cell to, for example, start the vehicle. In general, the DC/DC converter is operable for matching a plurality of voltages.

Traditionally, the TIM and the DC/DC converter are separate, discrete assemblies, including a 3-phase assembly for the TIM and an H-bridge assembly for the DC/DC converter. The TIM and the DC/DC converter have typically utilized separate, discrete high-voltage DC bus capacitors, DC bus bars, and high-voltage transistors. This configuration has several important limitations. High-voltage cables must be utilized to connect the TIM and the DC/DC converter. Separate, discrete thermal management systems must be utilized to cool the TIM and the DC/DC converter. The result is a complex, bulky, costly configuration. Thus, what is needed are systems and methods for integrating the TIM and the DC/DC converter.

BRIEF SUMMARY OF INVENTION

The present invention provides systems and methods for integrating the TIM and the DC/DC converter. Specifically, the present invention provides systems and methods for integrating the high-voltage DC bus capacitors, DC bus bars, and high-voltage transistors of the TIM and the DC/DC converter. Advantageously, the systems and methods of the present invention result in a simple, compact, and inexpensive TIM DC/DC converter assembly, utilizing common high-voltage cables and a common thermal management system.

In one embodiment, an integrated power conversion system for use in an electric vehicle including an electric motor, a primary high-voltage energy source, and an auxiliary energy source includes a traction inverter module operable to convert a DC current generated by the primary high-voltage energy source into an AC current capable of powering the electric motor, and a DC/DC converter operable to step-down a voltage of the high-voltage energy source and/or step-up a voltage of the auxiliary energy source, wherein the traction inverter module and the DC/DC converter share one or more common components, such as a high-voltage DC bus capacitor, a common DC bus bar, and a common high-voltage transistor.

In another embodiment, an integrated power conversion method for use in an electric vehicle including an electric motor, a high-voltage energy source, and an auxiliary energy source includes providing a traction inverter module operable for converting a DC current generated by the high-voltage energy source into an AC current capable of powering the electric motor, providing a DC/DC converter operable for stepping-down a voltage of the high-voltage energy source or stepping-up a voltage of the auxiliary energy source, and disposing a plurality of common components within the traction inverter module and the DC/DC converter. The plurality of common components may include a common high-voltage DC bus capacitor, a common DC bus bar, and a common high-voltage transistor.

In a further embodiment, an integrated power conversion system for use in a power generating system including an electric motor, a high-voltage energy source, and an auxiliary energy source includes a traction inverter module operable to convert a DC current generated by the high-voltage energy source into an AC current capable of powering the electric motor, wherein the traction inverter module comprises a first circuit, and a DC/DC converter operable to step-down a voltage of the high-voltage energy source or step-up a voltage of the auxiliary energy source, wherein the traction inverter module and the DC/DC converter share a common high-voltage DC bus capacitor, a common DC bus bar, and a common high-voltage transistor.

DETAILED DESCRIPTION OF THE INVENTION

Figure 1:
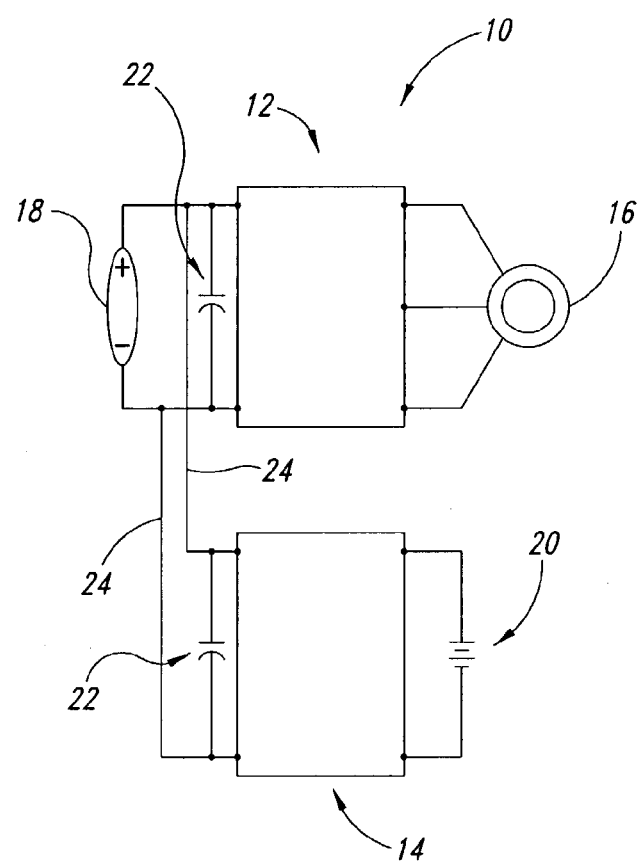
FIG. 1 is a circuit diagram of a system including separate, discrete TIM and DC/DC converter assemblies.

Referring to FIG. 1, as described above, the power conversion system 10 of EVs, fuel cell vehicles, and HEVs typically includes a separate, discrete TIM assembly 12 and DC/DC converter assembly 14. The TIM 12 inverts the high-voltage DC bus voltage to an AC voltage suitable for powering the motor 16, such as a 3-phase AC voltage. This power is inverted for driving and controlling the motor 16, i.e., for generating torque. The motor 16, in combination with the transaxle, converts the electrical energy into mechanical energy which turns the wheels of the vehicle. The DC/DC converter 14 uses PWM to step the voltage associated with the vehicle's high-voltage energy source 18, such as a battery, fuel cell, ultracapacitor, flywheel, or superconducting energy storage device down to that which the alternator of an ICE-powered vehicle would typically generate (13.5–14V). The DC/DC converter 14, which may be unidirectional or bi-directional, may be used to charge an auxiliary energy source 20 such as a 12V auxiliary battery, which is typically separated from the high-voltage energy source 18. The DC/DC converter 14 may also be used to transfer power from the auxiliary energy source 20 to the high-voltage energy source 18 to, for example, start the vehicle. In general, the DC/DC converter 14 is operable for matching a plurality of voltages.

The TIM 12 and the DC/DC converter 14 typically comprise separate, discrete assemblies, including a 3-phase assembly for the TIM 12 and an H-bridge assembly for the DC/DC converter 14. The TIM 12 and the DC/DC converter 14 may also utilize separate, discrete high-voltage DC bus capacitors 22 and DC bus bars 24. In this configuration, high-voltage cables must be utilized to connect the TIM 12 and the DC/DC converter 14. Separate, discrete thermal management systems must be utilized to cool the TIM 12 and the DC/DC 14 converter. The result is a complex, bulky, costly configuration.

Figure 2:
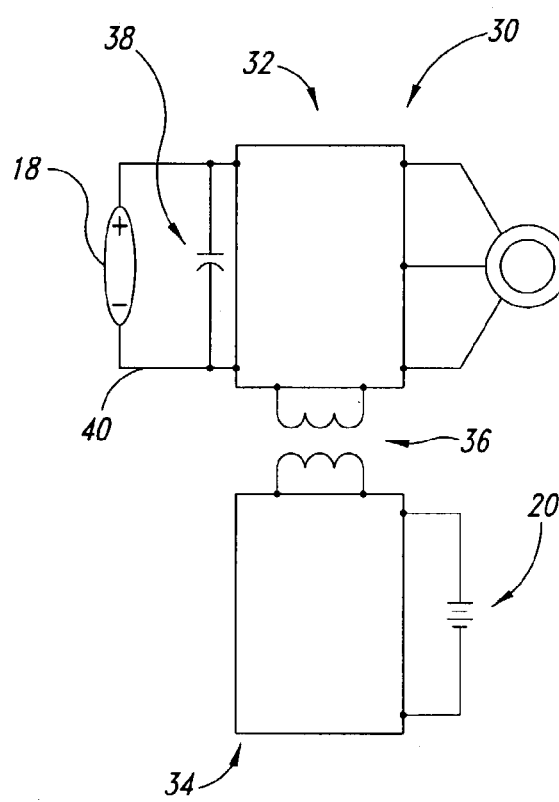
FIG. 2 is a circuit diagram of one embodiment of a system including integrated TIM and DC/DC converter assemblies.

Referring to FIG. 2, in one embodiment, a system 30 including an integrated TIM 12 (FIG. 1) and DC/DC converter 14 (FIG. 1) includes two integrated assemblies: a high-voltage assembly 32, including the TIM 12 and the high-voltage stage of the DC/DC converter 14, and a low-voltage assembly 34, including the low-voltage stage of the DC/DC converter 14 and a filter. The high-voltage assembly 32 is operatively connected to the low-voltage assembly 34 by a high-frequency transformer 36. Specifically, the method may include removing the high-voltage power transistors from the DC/DC converter 14 and integrating them with the TIM's transistor module. This configuration allows the TIM 12 and the DC/DC converter 14 to share a high-voltage DC bus capacitor 38 and to utilize a simplified DC bus bar 40. The integrated system 30 also includes the motor 16, the high-voltage energy source 18, and the auxiliary energy source 20, while the high-voltage energy source 18 will typically take the form of a battery or fuel cell stack and the auxiliary energy source 20 will typically take the form of a battery, these energy sources may take the form of any or a combination of batteries, fuel cell stacks, ultracapacitors, flywheels, and/or superconducting magnetic storage devices.

In this configuration, high-voltage cables utilized to connect the TIM 12 and the DC/DC converter 14 may be eliminated and a common thermal management system may be utilized to cool the high-voltage power stage of the TIM 12 and the DC/DC converter 14. The result is a simple, compact, inexpensive configuration.

Figure 3:
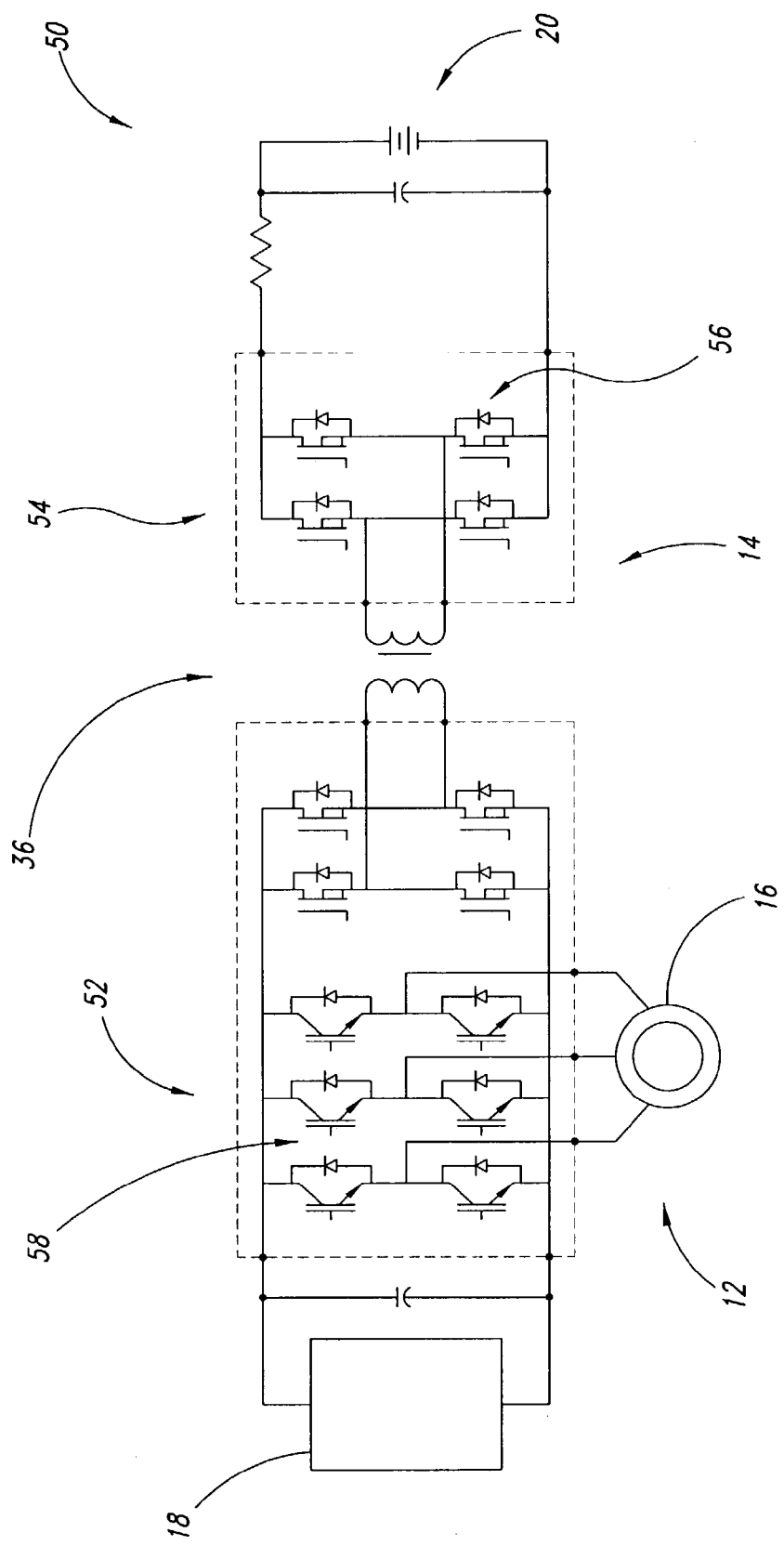
FIG. 3 is a circuit diagram of another embodiment of a system including integrated TIM and DC/DC converter assemblies, specifically including a 55 kW TIM inverter and a 3 kW boost 2 kW buck bi-directional DC/DC converter.

Referring to FIG. 3, in another embodiment, a TIM 12, such as a 55 kW TIM inverter, may be integrated with a DC/DC converter 14, such as a 3 kW boost 2 kW buck bi-directional DC/DC converter. The integrated system 50 includes a high-voltage bridge module 52 for the TIM 12 and the DC/DC converter 14 and a low-voltage bridge module 54 for the DC/DC converter 14. The high-voltage bridge module 52 is operatively connected to the low-voltage bridge module 54 by a high-frequency transformer 36. The integrated system 50 may also include the motor 16, a 250–420V high-voltage energy source 18, and the auxiliary energy source 20. The integrated system 50 may further include a plurality of switches 56, such as insulated gate bipolar transistors (IGBTs) 58 or MOSFETs. In this configuration, high-voltage cables utilized to connect the TIM 12 and the DC/DC converter 14 may be eliminated and a common thermal management system may be utilized to cool the high-voltage power stage of the TIM 12 and the DC/DC converter 14. Again, the result is a simple, compact, inexpensive configuration.

Figure 4:
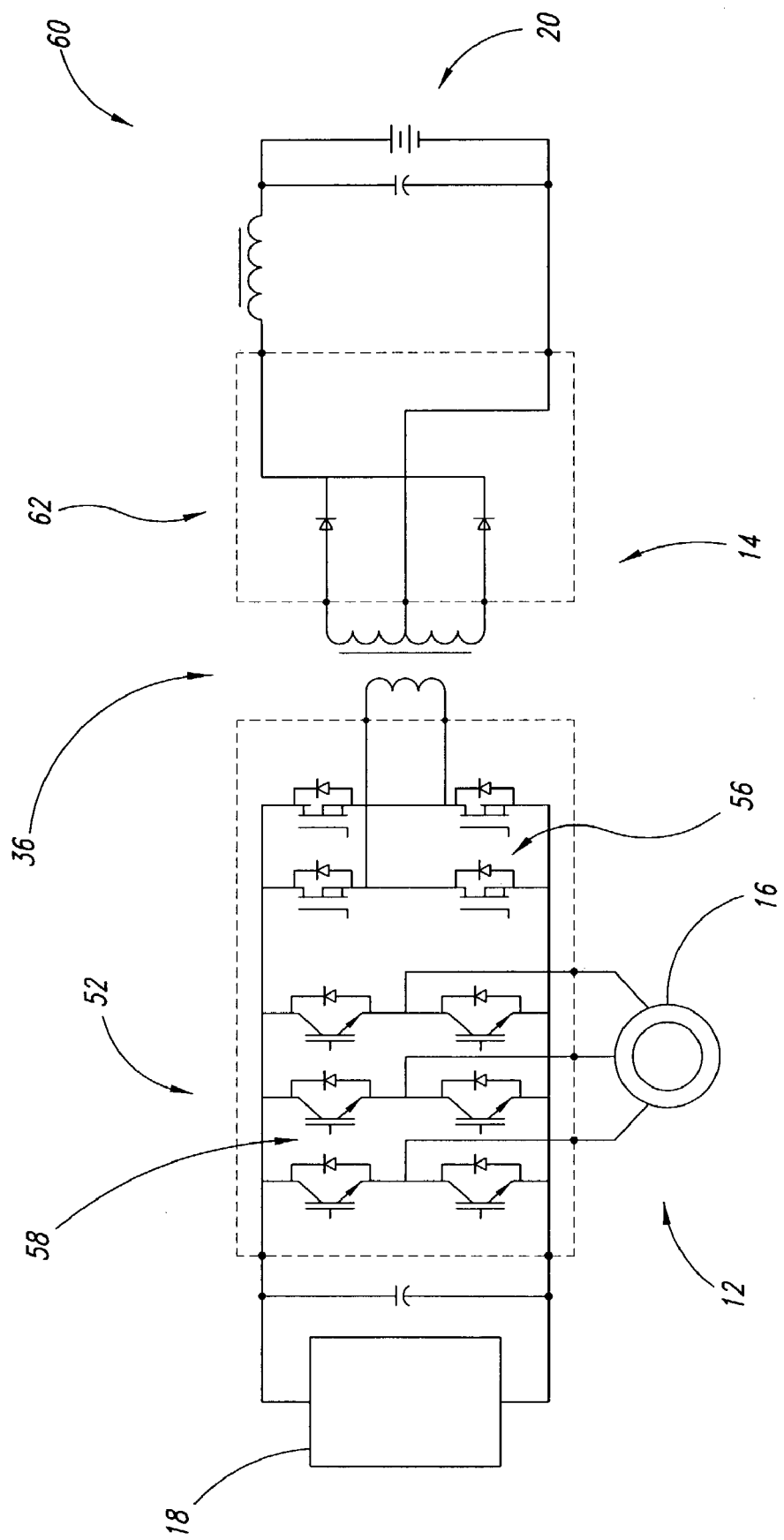
FIG. 4 is a circuit diagram of a further embodiment of a system including integrated TIM and DC/DC converter assemblies, specifically including a 55 kW TIM inverter and a 2 kW buck converter for 12V loads.

Referring to FIG. 4, in a further embodiment, a TIM 12, such as a 55 kW TIM inverter, may be integrated with a DC/DC converter 14, such as a 2 kW buck converter for 12V loads. The integrated system 60 includes a high-voltage bridge module 52 for the TIM 12 and the DC/DC converter 14 and a low-voltage rectifier 62 for the DC/DC converter 14. The high-voltage bridge module 52 is operatively connected to the low-voltage rectifier 62 by a high-frequency transformer 36. The integrated system 60 may also include the motor 16, the 250–420V high-voltage energy source 18, and the 12V auxiliary energy source 20. The integrated system 60 may further include a plurality of switches 56 such as IGBTs 58 or MOSFETs. In this configuration, high-voltage cables utilized to connect the TIM 12 and the DC/DC converter 14 may be eliminated and a common thermal management system may be utilized to cool the TIM 12 and the DC/DC converter 14. Again, the result is a simple, compact, inexpensive configuration.

Figure 5:
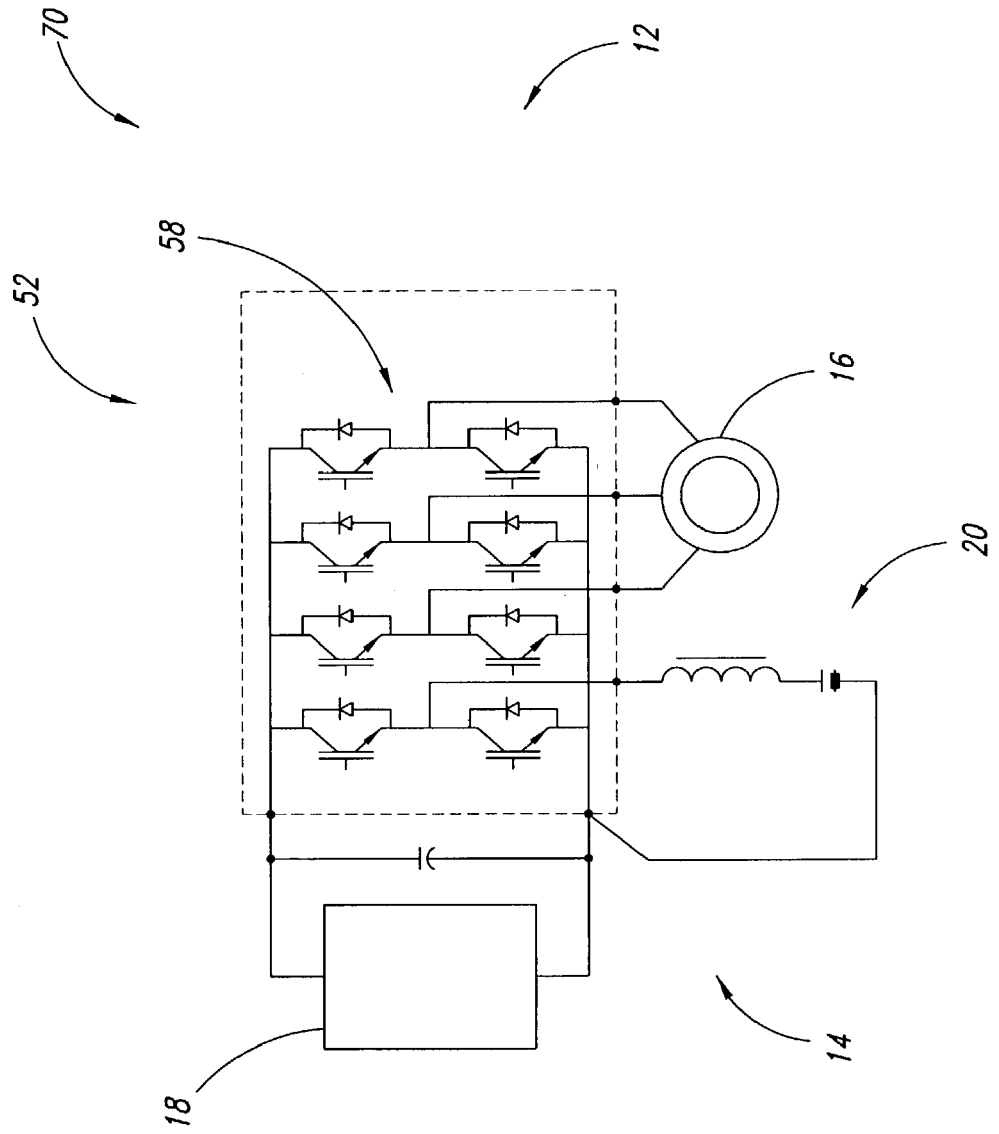
FIG. 5 is a circuit diagram of a further embodiment of a system including integrated TIM and DC/DC converter assemblies, specifically including a 55 kW TIM inverter and a 45–55 kW bi-directional DC/DC converter.

Referring to FIG. 5, in a further embodiment, a TIM 12, such as a 55 kW TIM inverter, may be integrated with a DC/DC converter 14, such as a 45–55 kW bi-directional DC/DC converter. The integrated system 70 includes a high-voltage bridge module 52 for the TIM 12 and the DC/DC converter 14. The integrated system 70 may also include the motor 16, the 250–420V high-voltage energy source 18, and a 150–190V auxiliary energy source 20. The integrated system 70 may further include a plurality of IGBTs 58 or MOSFETs. In this configuration, high-voltage cables utilized to connect the TIM 12 and the DC/DC converter 14 may be eliminated and a common thermal management system may be utilized to cool the TIM 12 and the DC/DC converter 14. Again, the result is a simple, compact, inexpensive configuration.

All of the above U.S. patents, U.S. patent application publications, U.S. patent applications, foreign patents, foreign patent applications and non-patent publications referred to in this specification and/or listed in the Application Data Sheet, including, but not limited to U.S. Serial No. 60/319,116 filed Feb. 20, 2002, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. An integrated power conversion method for use in an electric vehicle having an electric motor, a high-voltage energy source, and an auxiliary energy source, the integrated power conversion method comprising:

providing a traction inverter module comprising an inverter operable for converting a DC current generated by the high-voltage energy source into an AC current capable of powering the electric motor;

providing a DC/DC converter operable to at least one of step-down a voltage of the high-voltage energy source and step-up a voltage of the auxiliary energy source; and disposing a plurality of common components of the traction inverter module and the DC/DC converter in the traction inverter module.

2. The integrated power conversion method of claim 1 wherein providing the traction inverter module comprising an inverter operable for converting the DC current generated by the high-voltage energy source into the AC current capable of powering the electric motor comprises providing a first circuit operable for converting the DC current generated by the high-voltage energy source into the AC current capable of powering the electric motor.

3. The integrated power conversion method of claim 2 wherein providing the DC/DC converter operable to at least one of step-down the voltage of the high-voltage energy source and step-up the voltage of the auxiliary energy source comprises providing a second circuit operable to step-down the voltage of the high-voltage energy source or step-up the voltage of the auxiliary energy source.

4. The integrated power conversion method of claim 1 wherein disposing the plurality of common components of the traction inverter module and the DC/DC converter in the traction inverter module comprises disposing a common high-voltage DC bus capacitor within the traction inverter module.

5. The integrated power conversion method of claim 1 wherein disposing the plurality of common components of the traction inverter module and the DC/DC converter in the traction inverter module comprises disposing a common DC bus bar within the traction inverter module.

6. The integrated power conversion method of claim 1 wherein disposing the plurality of common components of the traction inverter module and the DC/DC converter comprises disposing a common high-voltage transistor within the traction inverter module.

7. The integrated power conversion method of claim 1, further comprising:
operatively connecting a portion of the traction inverter module and a portion of the DC/DC converter utilizing a high-frequency transformer.

8. The integrated power conversion method of claim 1 wherein the electric vehicle comprises an electric vehicle selected from the group consisting of a battery-powered vehicle, a fuel cell vehicle, and a hybrid electric vehicle.

9. The integrated power conversion method of claim 1 wherein the high-voltage energy source is at least one of a fuel cell, a battery, an ultracapacitor, a flywheel, and a superconducting magnetic storage device.

10. An integrated power conversion system for use in a power generating system having an electric motor, a high-voltage energy source, and an auxiliary energy source, the integrated power conversion system comprising:
a traction inverter module comprising a first circuit operable to convert a DC current generated by the high-voltage energy source into an AC current capable of powering the electric motor;
a DC/DC converter comprising a second circuit operable to step-down a voltage of the high-voltage energy source or step-up a voltage of the auxiliary energy source;

wherein the first circuit of the traction inverter module and the second circuit of the DC/DC converter share a common high-voltage DC bus capacitor;

wherein the first circuit of the traction inverter module and the second circuit of the DC/DC converter share a common DC bus bar; and wherein the first circuit of the traction inverter module and the second circuit of the DC/DC converter share a common high-voltage transistor.

11. The integrated power conversion system of claim 10 wherein a portion of the first circuit of the traction inverter module and a portion of the second circuit of the DC/DC converter are operatively connected by a high-frequency transformer.

12. A power conversion system, comprising:
a high-voltage bridge module;
a low-voltage bridge module;
a DC/AC inverter circuit comprising a number of switches operable to convert a direct current into an alternating current, each of the switches of the inverter circuit housed in the high-voltage bridge module; and
a DC/DC converter circuit comprising a number of high-voltage side switches and a number of low-voltage side switches, the high-voltage side switches and the low-voltage side switches of the DC/DC converter circuit operable to convert a voltage of a DC current, the high-voltage side switches housed in the high-voltage bridge module and the low-voltage side switches housed in the low-voltage bridge module.

13. The power conversion system of claim 12, further comprising:
a high frequency transformer electrically coupled between at least some of the switches of the high-voltage bridge module and at least some of the switches of the low-voltage bridge module.

14. The power conversion system of claim 13 wherein the high frequency transformer is electrically coupled between the high-voltage side switches and the low-voltage side switches of the DC/DC converter circuit.

15. The power conversion system of claim 12, further comprising:
at least one high voltage capacitor electrically shared by the DC/AC inverter circuit and the high-voltage side switches of the DC/DC converter circuit.

16. The power conversion system of claim 12, further comprising:
at least one bus bar electrically shared by the DC/AC inverter circuit and the high-voltage side switches of the DC/DC converter circuit.

17. The power conversion system of claim 12, further comprising:
a coolant management system thermally coupled to transfer heat from both the switches of the DC/AC inverter circuit and from the high-voltage side switches of the DC/DC converter circuit.

18. The power conversion system of claim 12 wherein the high-voltage and low-voltage side switches of the DC/DC converter circuit are operable to convert a voltage of a DC current by stepping down the voltage of the DC current.

19. The power conversion system of claim 12 wherein the high-voltage and low-voltage side switches of the DC/DC converter circuit are operable to convert a voltage of a DC current by stepping up the voltage of the DC current.

20. The power conversion system of claim 12, further comprising:

a primary high-voltage energy source electrically coupled to the high-voltage side switches of the DC/DC converter circuit; and an auxiliary power source electrically coupled to the low-voltage side switches of the DC/DC converter circuit.

21. The power conversion system of claim 20 wherein the primary high-voltage energy source comprises at least one of a fuel cell, a battery, an ultracapacitor, a flywheel, and a superconducting magnetic storage device.

22. The power conversion system of claim 12, further comprising:

an AC electric motor electrically coupled to the DC/AC inverter circuit to receive power thereby.

23. The power conversion system of claim 12 wherein the switches comprise at least one of insulated gate bipolar transistors or metal oxide semiconductor field effect transistors.

24. A power conversion system for use in an electric vehicle, the electric vehicle having an electric motor, a primary high voltage energy source, and an auxiliary energy source, the power conversion system comprising:

a high-voltage bridge module;

a low-voltage bridge module;

a DC/AC inverter circuit comprising a number of switches operable to convert a direct current into an alternating current, each of the switches of the inverter circuit housed in the high-voltage bridge module;

a DC/DC converter circuit comprising a number of high-voltage side switches and a number of low-voltage side switches, the high-voltage side switches and the low-voltage side switches of the DC/DC converter circuit operable to convert a voltage of a DC current, the high-voltage side switches housed in the high-voltage bridge module and the low-voltage side switches housed in the low-voltage bridge module;

a high frequency transformer electrically coupling the high-voltage side switches and the low-voltage side switches of the DC/DC converter circuit; and at least one high-voltage capacitor electrically shared by the DC/AC inverter circuit and the high-voltage side switches of the DC/DC converter circuit.

25. The power conversion system of claim 24, further comprising:

at least one bus bar electrically shared by the DC/AC inverter circuit and the high-voltage side switches of the DC/DC converter circuit.

26. The power conversion system of claim 24, further comprising:

a coolant management system thermally coupled to transfer heat from both the DC/AC inverter circuit and the high-voltage side switches of the DC/DC converter circuit.

* * * * *